(12) United States Patent
De Bona et al.

(10) Patent No.: US 6,470,737 B1
(45) Date of Patent: Oct. 29, 2002

(54) DEVICE FOR METERING FLOWABLE PRODUCTS

(75) Inventors: Paolo De Bona, Soprana (IT); Ermanno Graziola, Lessona (IT)

(73) Assignee: Lawer Spa, Cossato (IT)

( * ) Notice: Subject to any disclaimer, the term of this patent is extended or adjusted under 35 U.S.C. 154(b) by 66 days.

(21) Appl. No.: 09/691,326

(22) Filed: Oct. 17, 2000

(30) Foreign Application Priority Data

Nov. 26, 1999 (IT) .......................................... T099A1040

(51) Int. Cl.⁷ .......................... B65G 33/22; B29C 47/00
(52) U.S. Cl. .................... 73/64.56; 222/196.1; 222/413; 198/670; 366/184; 366/186; 366/188; 406/53; 406/54; 414/326
(58) Field of Search ..................... 73/64.56; 222/196.1, 222/199, 412, 413; 198/670, 671; 366/184, 186, 187, 188; 406/53, 54; 414/326

(56) References Cited

U.S. PATENT DOCUMENTS

| | | |
|---|---|---|
| 1,917,827 A | 7/1933 | Cloos |
| 2,059,435 A | 11/1936 | Brownlee |
| 2,554,796 A | 5/1951 | Runninger |
| 2,583,862 A * | 1/1952 | Lichtenstein ................. 222/199 |
| 3,647,330 A | 3/1972 | Hann ........................... 425/76 |
| 4,579,482 A | 4/1986 | Gastaldi et al. |

FOREIGN PATENT DOCUMENTS

| | | |
|---|---|---|
| DE | 295 10 210 | 6/1994 |
| EP | 0 287 708 | 10/1988 |
| EP | 0 943 368 | 9/1999 |

* cited by examiner

Primary Examiner—Daniel S. Larkin
(74) Attorney, Agent, or Firm—Dorsey & Whitney LLP

(57) ABSTRACT

A device for metering flowable products, such as products in the form of powder, granules, or microspheres, usable, for example, for the preparation of treatment baths, such as baths for dyeing, comprises at least one passage for the material to be delivered, the passage leading to a diaphragm. The aforesaid diaphragm can be moved according to a vibratory motion produced, for example, by a vibrating member mounted on the device. Preferably, the diaphragm carries, associated to it, a further diaphragm, which, in conditions of fine dispensing, comes up against the first diaphragm, so as to achieve, by the effect of the common vibratory motion, an action antagonistic to the formation of aggregates or micro-aggregates in the material to be delivered.

19 Claims, 2 Drawing Sheets

DEVICE FOR METERING FLOWABLE PRODUCTS

CROSS-REFERENCE TO RELATED APPLICATION

This application corresponds to and claims priority to Italian Application No. TO99A001040, filed Nov. 26, 1999. This Italian application is hereby incorporated by reference as though fully set forth herein.

BACKGROUND OF THE INVENTION

The present invention relates to devices for metering flowable products, the term "flowable products" here being used to indicate products such as products in the form of powder, granules, or microspheres that are to be conveyed by getting them to flow. Products of this sort are widely used, for instance, in the chemical industry, the foodstuffs industry, or (with reference to the sector of application which will be referred to more than once in what follows, without, at the same time, this implying any limitation of the scope of the invention) in the textile industry, in particular in plants for the preparation of treatment baths, such as baths for dyeing.

A solution widely adopted in the known art envisages that the products in question be stored in containers that basically resemble tanks, equipped, in their bottom part, with a metering outlet. Associated to the latter there is usually a motor-driven member, such as a screw conveyor, the operation of which produces the controlled output of the material that is in the container.

In the recourse to this type of solution various problems are encountered.

In the first place, it is essential to ensure the precision of the metering action. The exact quantity of material delivered represents in fact a determining factor for the end result that is sought. A high metering precision may be achieved using dispensing members of small dimensions. This choice, however, runs up against the need to ensure adequate metering rates, which are of importance, for example, when metering the main components of a mixture.

In the second place, the majority of flowable products referred to previously (usually fine powders or hygroscopic materials, or again materials treated in such a way as to reduce their tendency towards dispersion in the environment in a volatile form) tend to agglomerate or, as is often said, "pack together" in the storage container. For this reason, the containers referred to are usually equipped, above the metering outlet, with agitating members, such as mechanical agitators, basically resembling crank shafts.

In EP-A-0 943 368 (used as reference for the preamble of Claim 1) there has already been proposed a device comprising at least one chamber that defines a respective passage for the materials being metered and is limited by at least one wall that can be moved according to a vibratory motion, usually exerted by a device for generating vibrations of a mechanical type.

The results that may be achieved with this known solution are to be deemed certainly satisfactory, also as regards the possibility of obtaining a fine proportioning of the product being delivered. There exists, however, the need to improve the operating characteristics of the said device further, above all as regards operation in the presence of high rates of delivery, without this proving prejudicial to the possibility of performing a fine metering action.

The purpose of the present invention is to provide a metering device of the type specified above, further improved from this and other points of view.

According to the present invention, this purpose is achieved thanks to a device having the characteristics referred to in the ensuing claims.

BRIEF DESCRIPTION OF THE DRAWINGS

Purely to provide a non-limiting example, the invention will now be described with reference to the attached drawings, in which.

DESCRIPTION OF THE PREFERRED EMBODIMENTS

The various figures of the drawings represent the bottom part of a container or tank T designed to contain a certain amount of flowable product or material M. As regards the term "flowable," the reader is referred to the premise concerning terminology appearing in the introductory part of the present description.

The container or tank T in question may be one of the tanks included in an automatic plant for the preparation of dyes in the so-called "colour kitchen" of a textile plant. Plants of this kind are amply known in the prior art. This applies also to the possible presence, in the same plant, of a plurality of tanks, such as the tank T, designed to co-operate with a station for the formulation of the mixtures (not illustrated). Here, there is usually a weighing-machine with a mixing container, in which precisely metered quantities of material taken from the various tanks are subsequently made to fall.

It is, however, recalled once again that the specific example of embodiment illustrated herein and the corresponding field of application must not in anyway be considered as limiting the scope of the present invention.

Figure 3:
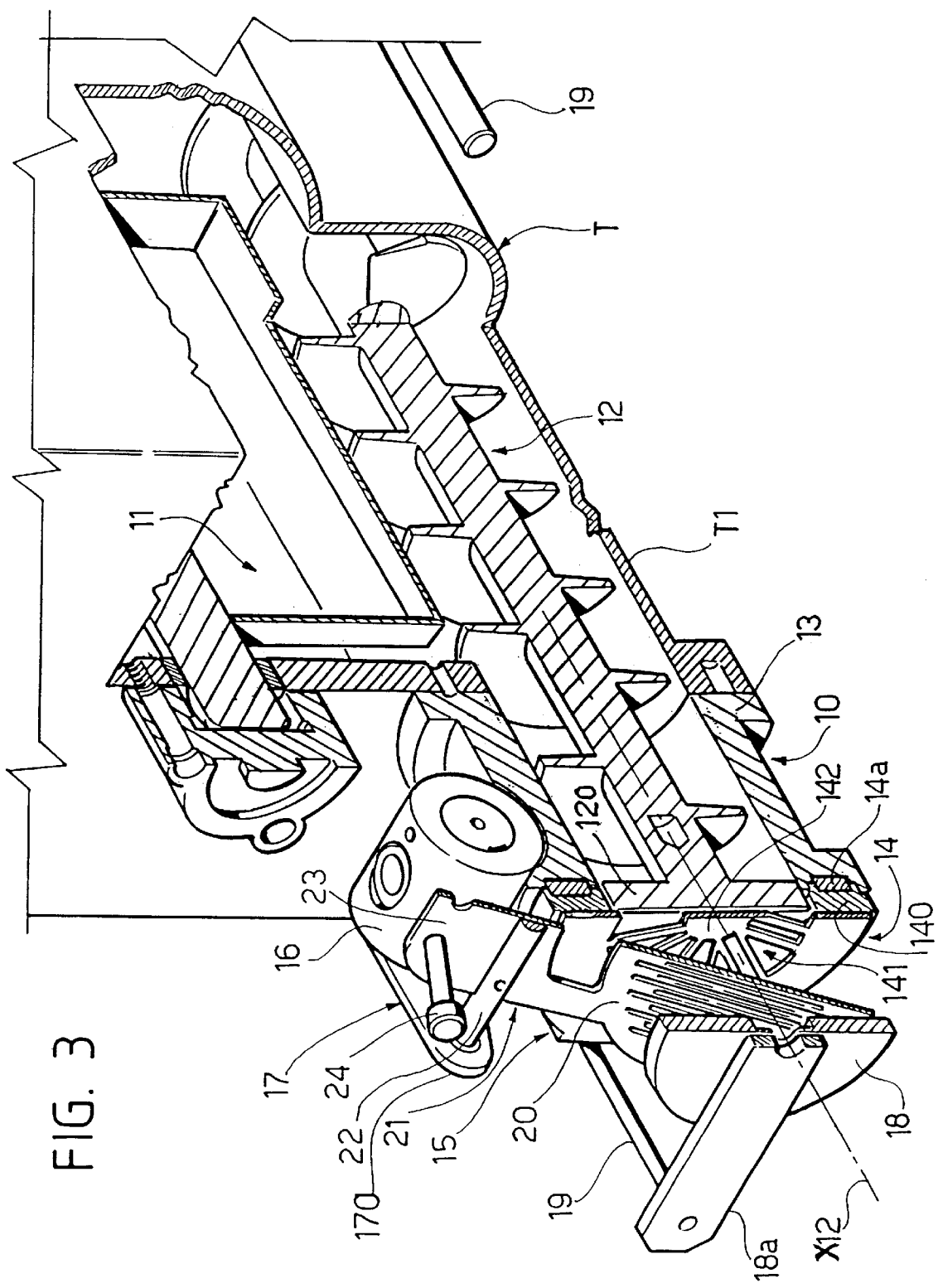
FIG. 3 is a perspective view partially sectioned according to a vertical plane identified by the arrows II—II of FIG. 1, FIG. 3 being moreover a representation at a slightly enlarged scale as compared to FIGS. 1 and 2.

The tank T has a bottom portion or bottom T1 (FIG. 3) having preferably, but not necessarily, a hollow shape or a channel shape converging towards a metering outlet 10. In the example of embodiment illustrated, the outlet 10 is in a lateral position with respect to the general development of the tank T.

The structure and conformation of the tank T may, however, be different from the ones illustrated herein, the foregoing being according to criteria known in the prior art, and thus not requiring further illustration herein, also for the reason that they are not in themselves relevant for the purposes of understanding the present invention. This also applies to the fact that, within the tank T, and usually in the vicinity of the bottom portion T1, mechanical agitating members 11 are provided, which are designed to apply, on the material M, at least at the moment of proportioning, a certain type of movement designed to eliminate any aggregates that may have formed in the material M during storage or warehousing.

In the exemplary embodiment illustrated (which, it is emphasized, is provided merely for purposes of illustration), the output of the material M through the metering outlet 10 is promoted by means of a screw conveyor 12. The conveyor 12 is driven in rotation about a corresponding axis of rotation X12 (horizontal, in the example of embodiment illustrated) by a corresponding motor-powered member, not represented in the drawings, but of a known type.

The choice, for controlling the metering of the material M, of a screw conveyor is not, on the other hand, imperative. It is, however, an advantageous choice in so far as it enables the metering outlet 10 to be made in the form of a cylindrical body 13 provided with an axial cavity the axis of which coincides with the axis X12. In this way, the distal stretch of the screw conveyor 12 may extend in the direction of the corresponding end of the metering outlet 10, where there is a disk-like element 14 mounted on the body 13 so as to be able to move with a vibratory motion with respect to the body 13 itself.

In the exemplary embodiment illustrated, this result is obtained by installing the element 14 on the body 13 with the interposition of a body of elastomeric material 14a basically resembling an annular gasket made of a material, such as rubber or a similar material.

In the exemplary embodiment illustrated, the element 14 is made up of:
- an external annular body 140, the central opening of which has a shape and a diameter substantially corresponding to the shape and diameter of the internal cavity of the body 13, and
- a central portion 141 (made preferably as a separate element with respect to the external body 140, in such a way that it can be conveniently replaced according to the type of material to be metered) constituting a sort of diaphragm which extends through the distal opening of the metering outlet 10.

Usually, the diaphragm 141 presents a conformation with apertures, comprising a plurality of spokes that connect the annular body 140 to a central portion 142 aligned with the axis X12 of the screw conveyor 12.

Preferably, the latter is provided, at a point corresponding to its distal end, which is located immediately up against the diaphragm 141, with a bladed body 120.

During rotation of the screw conveyor 12 about the axis X12, the bladed body 120 rotates, thus performing, with respect to the spokes of the diaphragm 141, a sort of scraping action which, even in the absence of contact, counteracts the tendency towards the formation of aggregates or micro-aggregates of material M up against the spokes of the diaphragm 141.

While maintaining the same general conformation presenting apertures, the diaphragm 141 could have an appearance different from the one illustrated. For instance, it could assume the form of a disk-like body provided with circular apertures, with an overall grid-like conformation and/or, in general, with any conformation capable of ensuring an adequate section of passage for the material M that is dispensed through the outlet 10; the foregoing, while at the same time ensuring, even so, an action of containment of the material M, in order to prevent uncontrolled output of the material M from the distal opening of the outlet part.

Figure 1:
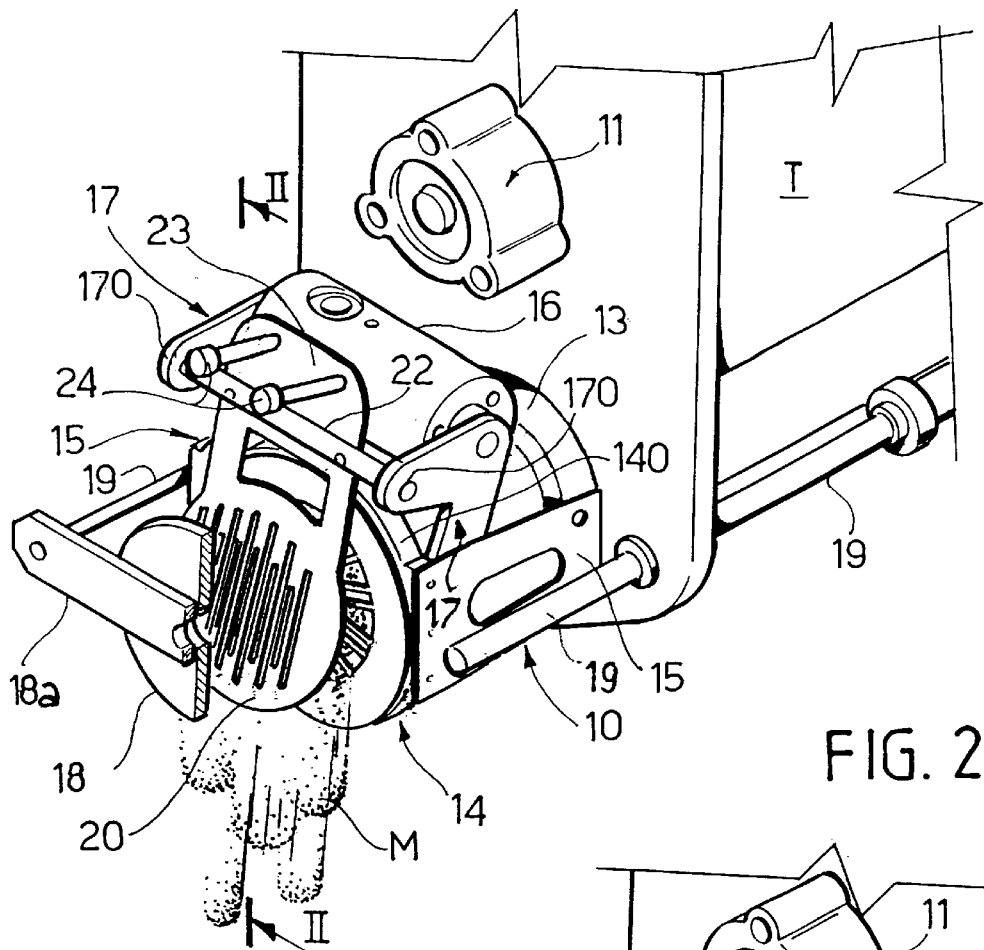
FIGS. 1 and 2 are two perspective views of a metering device according to the present invention illustrated in two different possible conditions of operation.
Figure 2:
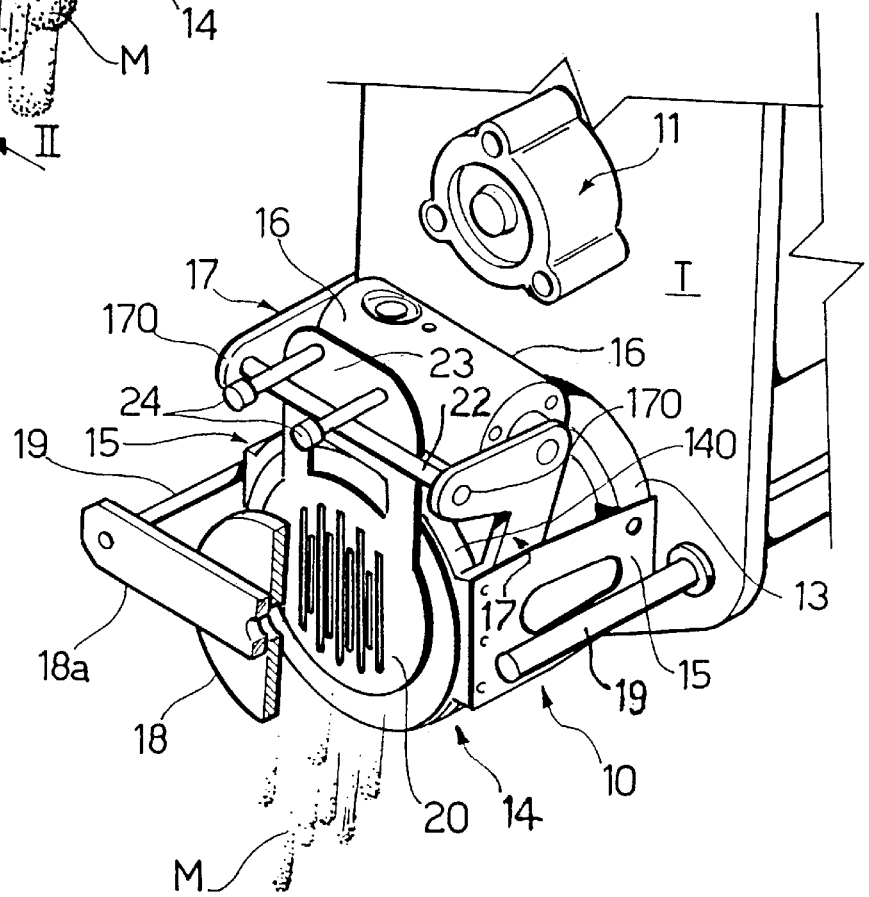

With reference in particular to FIGS. 1 and 2, it may be noted that the annular body 140 of the element 14 is mounted and supported on the tank T by means of two arms 15, which assume, in the exemplary embodiment illustrated, the shape of thin plates. These arms extend each in a respective vertical plane, enabling the element 14, as a whole, to perform a movement of vibration with respect to the tank T and the body 13 of the outlet part 10 in a direction which, in the example of embodiment illustrated, is substantially horizontal. In this connection, it is to be recalled that the element 14 is mounted on the body 13 with the interposition of the body 14a, which enables its vibration.

The above-mentioned movement of vibration is brought about by a vibratory device 16 comprising a generator of vibrations, for example of a mechanical type. Generators of this kind are widely known in the prior art, also in numerous variants of construction (eccentric turbines, piezo-electric elements, etc.), with the possibility of producing vibratory movements having frequencies of from just a few Hertz up to dozens or hundreds of Hertz or more.

Generally, these are pneumatically or electrically operated devices, supplied through pipes or cables (not illustrated in the attached drawings).

In the example of embodiment illustrated, the generator 16 assumes the form of a cylindrical body mounted in a position that is generically higher than the metering outlet 10, on two brackets 17. The brackets 17 extend upwards starting from the regions diametrically opposite. In areas corresponding to these regions, the annular body 140 is supported by the arms 15.

For reasons that will appear more clearly in what follows, the brackets 17 are preferably made in the form of L-shaped elements having two branches 170 which project forwards until they set themselves with their end portions in substantial alignment with the vertical plane in which the diaphragm 141 is located.

When activated, the member 16 transmits its vibratory motion, via the brackets 17, to the element 14. The latter is thus able to vibrate (primarily in a horizontal direction) with respect to the body 13 of the metering outlet 10, thanks to the assembly obtained using the elastomer element 14a and the arms 15.

The solution of assembly illustrated herein thus envisages that the member 16 be associated in a stable way to the tank T. This solution, however, is not imperative: awhile maintaining the mode of operation described in greater detail in what follows, it is in fact possible to conceive associating the vibratory member 16 to one part or to a set of parts capable of being fitted to the tank T (and in particular to the element 14 which carries the diaphragm 141) only at the moment in which it is intended to carry out metering of the material M starting from the tank T. For example, the vibratory member 16 maybe associated to the metering station of a plant of which a plurality of tanks T form part, all this, avoiding the need to associate a respective vibratory member 16 to each of the tanks T, the total number of which may be even quite high.

The reference number 18 designates a plate-type body (usually a disk-like body, here represented only in half of its complete development), the axis of which coincides with the axis X12 of the screw conveyor. The disk-like body 18 is mounted, usually by means of one or more arms 18a, on respective pusher elements 19.

The latter, usually consisting of rods resembling the stems of respective hydraulic jacks which can move in a direction parallel to the axis X12, make it possible selectively to displace the disk-like element 18 between:
- a position at a distance from the diaphragm 141, represented in the attached drawings, which enables metering of the material M; and
- a closed position (not illustrated in the drawings but intuitively perceptible), in which the body 18 comes up against the diaphragm 141 (with the possible interposition of further parts which will be described in what follows), so as to occlude the apertures of the diaphragm 141 itself.

The additional parts, mention of which has just been made, consist basically of a further diaphragm 20, which may, as a whole, be likened to the diaphragm 141 and is designed to co-operate with the latter.

The diaphragm 20 (the characteristics of which will be described in greater detail in what follows) is made in such a way as to be brought selectively up against the diaphragm 141 and at a certain distance from the latter, according to the intensity of the flow of the material M coming out of the metering outlet 10.

In the example of embodiment illustrated (it is emphasized that the same modes of operation may also be obtained even in a different way, for example by means of a special actuating device), the diaphragm 20 constitutes the bottom part of a thin plate-like body 21 mounted, as a rocker arm, on a shaft 22 which extends as far as the connection of the free ends 170 of the brackets 17.

In particular, the shaft 22 is able to perform a rotational movement about a horizontal axis (orthogonal to the axis X12), causing the diaphragm 20, which makes up the bottom branch of the rocker-arm structure, to approach or to move away from the diaphragm 141 when the top end of the same rocker-arm structure, designated by 23 and located above the shaft 22, performs a movement in the opposite direction.

Mounted on the top part 23, in such a way that they protrude forwards with respect to the set of parts described, and hence moving away from the body of the tank T, are one or more counterweights 24, the function of which is such as to cause the rocker-arm structure just described to tend to return spontaneously, by the effect of gravity, towards the position in which the diaphragm 20 is up against the diaphragm 141 and in contact with the latter (FIG. 2).

Of course, by varying the number, size, and/or conformation of the counterweight or counterweights 24, or else by resorting to different solutions, such as return springs, it is possible to vary selectively the intensity of the force with which the diaphragm 20 is pushed towards the aforesaid position of equilibrium.

The diaphragm 20 in general presents a laminar structure with apertures, which resembles that of the diaphragm 141 described previously. This also applies to the possible variants in terms of number, shape, size, and distribution of the apertures.

Preferably, however, the apertures provided in the diaphragm 20 may be such that their number, size, and/or conformation do not coincide exactly with the homologous characteristics of the apertures provided in the diaphragm 141.

In the exemplary embodiment illustrated, this result is obtained simply by causing the apertures in the diaphragm 141 to be delimited essentially by spoke-like elements extending in a radial direction with respect to the diaphragm 141 itself, whilst the apertures in the diaphragm 20 assume the form of an array of slits aligned in a common diametral direction with respect to the development of the diaphragm 20 (here built—in a preferential but not imperative way—with a substantially circular shape).

In addition to the closed position to which reference has already been made previously (the position in which the disk-like element 18 occludes the opening for metering of the material M, the metering device according to the invention affords two different positions of metering, or more correctly, two sets of possible positions of metering of the material M.

The first metering condition is the one that maybe obtained when, the disk-like element 18 having been moved away from the element 14 (i.e., the element 18 being brought into the position illustrated in all three figures of the attached drawings), the screw conveyor 12 is activated at a rate of rotation such that the output of the material M exerts, on the diaphragm 20, a force, the intensity of which causes the diaphragm 20 itself to move away from the diaphragm 141.

In this operating condition (which is the one illustrated in FIGS. 1 and 3), the material M comes out of the metering outlet 10, dropping downwards, passing, so to speak, beneath the diaphragm 20, the presence of which has practically no effect on the metering flow.

In these conditions, activation of the vibratory member 16 is such as to set the element 140 and the diaphragm 141 carried by the latter into vibration. The material M can be made to come out of the metering outlet 10 even at very high rates, above all when the bladed body 120 is in a position corresponding to the distal end of the screw conveyor 12. In particular, the experiments conducted by the present applicant demonstrate that the fact of applying to the diaphragm a vibratory movement enables—all other operating conditions being equal—a marked increase to be achieved in the rate of delivery of the material M through the outlet 10. In other words, the rate that may be achieved by applying the above-mentioned vibratory motion proves to be amply superior (even 40% higher) to the rate achievable—all other operating conditions being equal—when the vibratory device 16 is kept de-activated.

Without wishing to tie himself down to any specific theory in this regard, the applicant has reason to believe that the above phenomenon is due to the fact that the intense shaking motion of the diaphragm 141 (possibly in co-operation with the bladed body 120, which in itself does not vibrate, but rotates with the screw conveyor 12 on which it is installed) presents a marked antagonistic effect in regard to the formation of aggregates or micro-aggregates of the material M in a position corresponding to the aperture of the metering outlet and, with all likelihood, to the regions located upstream of the metering outlet.

The second operating condition is the one represented in FIG. 2 and may be achieved in the presence of highly contained flows of material M, i.e., ones typical of the performance of an operation of fine metering or dispensing (micro-dispensing). This condition may be achieved, for example, by reducing, with appropriate dispensing ramps, the rate of rotation of the screw conveyor (up to its possible final arrest), maintaining the vibratory member 16 activated. In addition to being transferred to the element 14 and the diaphragm 141, the corresponding vibratory motion is transferred, via the brackets 17 and the shaft 22, also to the rocker-arm structure of which the diaphragm 20 forms part.

The above-mentioned rocker-arm structure is usually mounted on the ends 170 of the brackets 17 in such a way as to enable a certain play in the direction of the shaft 22.

In this way, it is possible to cause the two diaphragms 141 and 20 to end up having substantially coplanar vibratory motions, but ones out of phase with respect to as one another, albeit being set in vibration by the same vibratory member 16. In view also of the different conformation of the respective apertures, the solid parts of the diaphragm 141 and 20 thus move with vibratory motions that are out of phase with respect to one another, so as to give rise to a sort of "shearing" effect.

In this way, possible aggregates or micro-aggregates which could tend to form in the material M coming through the ports jointly defined by the apertures of the two diaphragms 141 and 20 are subjected to an action of demolition. Micro-dispensing may therefore be achieved with high precision since the material M conserves its original particulate structure without formation of aggregates or, at most, with a possible reduction of its particulate structure into a finer particulate structure.

At the same time, the vibratory motion imparted by the vibratory member 16 causes the material M to come out of the distal opening of the outlet 10 part without the aforesaid movement requiring operation of the screw conveyor 12. Should the operation of fine dispensing be protracted for a sufficiently long period of time to exhaust the amount of material M available at the distal end of the screw conveyor 12, the screw conveyor 12 itself maybe made to advance for a stretch of its angular travel (for instance, by a stretch of the respective actuating motor, should the latter be a stepper motor), in such a way as to reconstitute, up against the diaphragm 141, a supply of material M sufficient to cause the dispensing operation to proceed.

Of course, without prejudice to the principle of the invention, the details of construction and the embodiments may vary widely with respect to what is described and illustrated herein, without thereby departing from the scope of the present invention.

What is claimed is:

1. A device for metering flowable products, the device comprising at least one passage for the flowable products being metered, the device having associated therewith at least one part adapted to be moved with a vibratory motion, wherein said at least one passage comprises a duct ending in a diaphragm provided with apertures for the passage of the flowable products being metered; and said diaphragm constitutes said at least one part adapted to be moved with said vibratory motion, wherein said diaphragm is operatively associated with said duct with the interposition of suspension means that can enable said vibratory motion.

2. A device according to claim 1, wherein said suspension means comprise a body made of elastomeric material.

3. A device according to claim 2, wherein said body made of elastomeric material has a generally annular configuration.

4. A device according to claim 1, wherein said suspension means comprise at least one flexible arm.

5. A device according to claim 4, wherein said at least one flexible arm has a generally laminar configuration.

6. A device according to claim 1, wherein said suspension means supports said diaphragm, and wherein said suspension means comprises at least one supporting element adapted to cooperate with a vibration-generating member that generates said vibratory motion.

7. A device according to claim 6, wherein said vibration-generating member comprises apart of the device itself and wherein said vibration-generating member is mounted on said at least one supporting element.

8. A device according to claim 6, comprising a further diaphragm provided with respective apertures for the passage of said flowable products being metered, said further diaphragm being adapted to move selectively between:

at least one first operating condition in which said further diaphragm is substantially disengaged from said diaphragm, and at least one second operating condition in which said further diaphragm is located up against said diaphragm, and wherein said further diaphragm is supported by said at least one supporting element carrying said vibration-generating member.

9. A device according to claim 1, comprising a vibration-generating member that generated said vibratory motion, said vibration-generating member comprising a part of the device itself.

10. A device according to claim 1, comprising a screw conveyor to cause the flowable products being metered to flow towards said diaphragm.

11. A device according to claim 10, wherein said passage is defined by a cylindrical body with a respective axial cavity, and wherein said screw conveyor has a distal end extending through said cylindrical body.

12. A device according to claim 1, further comprising a closing body adapted to be selectively moved towards a position of occlusion of said passage up against said diaphragm.

13. A device for metering flowable products, the device comprising at least one passage for the flowable products being metered, the device having associated therewith at least one part adapted to be moved with a vibratory motion, wherein said at least one passage comprises a duct ending in a diaphragm provided with apertures for the passage of the flowable products being metered; and said diaphragm constitutes said at least one part that can be moved with vibratory motion, said device for metering flowable products further comprising a screw conveyor to cause the flowable products being metered to flow towards said diaphragm, wherein said screw conveyor comprises a distal end and a bladed body at said distal end, said bladed body being adapted to rotate in close vicinity of said diaphragm by the effect of the operation of the screw conveyor itself.

14. A device for metering flowable products, the device comprising at least one passage for the flowable products being metered, the device having associated therewith at least one part adapted to be moved with a vibratory motion, wherein said at least one passage comprises a duct ending in a first diaphragm provided with apertures for the passage of the flowable products being metered; and said first diaphragm constitutes said at least one part that can be moved wit vibratory motion, said device for metering flowable products further comprising a second diaphragm provided with respective apertures for the passage of said flowable products being metered, said second diaphragm being adapted to move selectively between at least one first operating condition in which said second diaphragm is substantially disengaged from said first diaphragm, and at least one second operating condition in which said second diaphragm is located up against said first diaphragm.

15. A device according to claim 14, wherein said second diaphragm forms part of an orientable structure having associated therewith return means acting to bring said second diaphragm up against said first diaphragm.

16. A device according to claim 15, wherein said orientable structure is a rocker-arm structure.

17. A device according to claim 14, wherein said second diaphragm is also adapted to be moved with a vibratory motion.

18. A device according to claim 17, wherein said second diaphragm is mounted on a common supporting structure with said first diaphragm.

19. A device according to claim 14, wherein said respective apertures of said second diaphragm are different from the apertures of said first diaphragm for at least one characteristic chosen from the group made tip of number, size, and conformation of said apertures and of said respective apertures.

* * * * *